United States Patent [19]
Hausler et al.

[11] 3,810,009
[45] *May 7, 1974

[54] APPARATUS FOR MEASURING MATERIAL FOULING OF A TEST SPECIMEN

[75] Inventors: Rudolf H. Hausler, Rolling Meadows; Robert W. Sampson, Arlington Heights, both of Ill.

[73] Assignee: Universal Oil Products Company, Des Plaines, Ill.

[*] Notice: The portion of the term of this patent subsequent to May 1, 1990, has been disclaimed.

[22] Filed: Apr. 20, 1972

[21] Appl. No.: 246,044

Related U.S. Application Data

[63] Continuation-in-part of Ser. No. 186,888, Oct. 6, 1971, Pat. No. 3,731,187.

[52] U.S. Cl. ............................ 324/65 R, 324/71 R
[51] Int. Cl. ............................................. G01r 27/02
[58] Field of Search ............. 324/65 R, 65 CR, 71 R

[56] References Cited
UNITED STATES PATENTS

| | | |
|---|---|---|
| 3,609,549 | 9/1971 | Hausler et al. ............... 324/65 R |
| 2,824,283 | 1/1958 | Ellison ........................... 324/65 R |
| 2,987,685 | 6/1961 | Schaschl ...................... 324/65 CR |
| 3,067,386 | 12/1962 | Freedman .................... 324/65 CR |

*Primary Examiner*—Stanley T. Krawczewicz
*Attorney, Agent, or Firm*—James R. Hoatson, Jr.; William H. Page, II; Ronald H. Hausch

[57] ABSTRACT

An apparatus and method for measuring material buildup or fouling on a test specimen in which at least a portion of a temperature sensitive voltage output means is located proximate to a test specimen. The extent of fouling is determined by the change in a detected current or voltage signal resulting from the change in the heat transfer coefficient of the test specimen. The temperature sensitive voltage output means is at the same temperature as the temperature of the medium in which the test specimen resides and adjusts either a detected current or voltage signal to negate the effects of varying temperature of the medium on the detected signal.

7 Claims, 2 Drawing Figures

APPARATUS FOR MEASURING MATERIAL FOULING OF A TEST SPECIMEN

BACKGROUND OF THE INVENTION

This application is a continuation-in-part application of our co-pending application Ser. No. 186,888 filed Oct. 6, 1971, now U.S. Pat. No. 3,731,187.

The present invention is directed to an apparatus and method which is used to determine the extent of fouling on surfaces in environments where fouling may occur and wherein it is desirable to determine the extent of such fouling.

It is frequently desirable to determine the extent of fouling of surfaces through laboratory or field testing. Such testing is useful to indicate what species of antifouling agent may be used satisfactorily and to determine whether the fouling of the surface has made the apparatus inefficient as a heat exchange device or the like. Fouling may be determined in different ways, although some have proved to be impractical. The most frequently used method is to insert a probe into the fouling environment and after a predetermined time period remove the probe and weigh the same to determine material buildup. This procedure cannot be made continuous and may not indicate whether the surface is actually being blocked or made inefficient by the material buildup.

SUMMARY OF THE INVENTION

Accordingly, it is an object of this invention to provide a fouling measuring device which may be used to continuously measure the extent of fouling of a surface.

Another object of this invention is to provide for the method of measuring the extent of fouling of a surface.

In a broad aspect the present invention provides for a method of determining the material buildup on the surface of a probe by detecting an electrical signal dependent on the heat transfer coefficient $K$ of a given surface area of the probe, $K$ being defined as the amount of energy which can be passed through unit surface per unit time and per unit of temperature measurement, comprising the steps of: (a) establishing a voltage value across said probe and a current value through said probe; (b) detecting a signal representing one of the aforesaid values as the dependent variable (c) maintaining the value of the other aforesaid value constant at a given reference temperature; and, (d) adjusting the signal of step (b) to compensate for changes in resistivity of the probe due to incidental temperature deviations of the environment, whereby the signal of the dependent variable will indicate a change in $K$ independent of temperature changes of the environment.

Preferably a signal is detected representing the constant value of step c. Then $K$ can be determined according to the following formula:

$$K = V I^2 \alpha_2 Re/[(V - I Re) F]$$

where $V$ and $I$ are the detected values of voltage and current respectively, one of which is held constant, $\alpha_2$ is the temperature coefficient of resistivity of the probe defined at the reference temperature, $R_e$ is the resistance of the probe at the reference temperature and $F$ is the given surface area of the probe.

In another aspect the present invention provides for an apparatus for measuring the material buildup on the surface of a probe in an environment having incidental temperature deviations by detecting an electrical signal value dependent on the heat transfer coefficient $K$ of a given surface area of the probe comprising in combination: (a) first means for establishing a voltage value $V$ across said probe and a current value $I$ through said probe; (b) second means for detecting a signal representing one of the aforesaid values as the dependent variable; and (c) third means for adjusting said second means to compensate for changes in resistivity of the probe due to incidental temperature deviations of the environment, whereby the dependent variable signal will indicate a change in $K$ independent of temperature changes of the environment.

As set forth above, $K$, the heat transfer coefficient, is defined as the amount of energy which can be passed through a given surface, per unit time per unit temperature. Any layer of solid material buildup on a surface will reduce $K$. Therefore fouling can be determined and observed as a function of time by measuring $K$.

Reference to the drawing and the following description thereof will serve to more fully describe the present invention as well as set forth additional advantageous features thereof.

Figure 1:
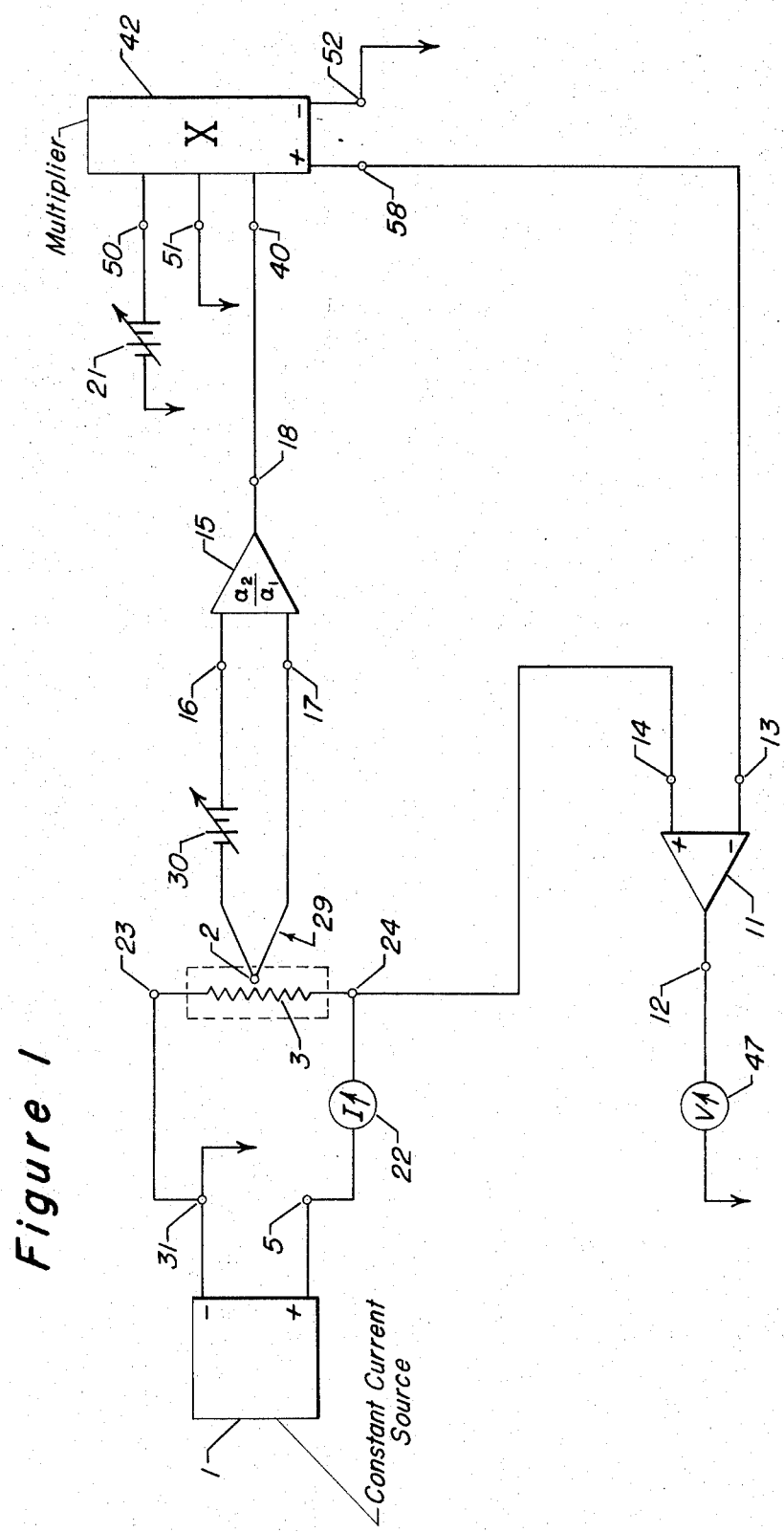
FIG. 1 of the drawing is a diagram of a resistance probe fouling measuring device according to this invention utilizing a constant current source.

The embodiment illustrated in FIG. 1 is a resistance probe fouling measuring device having a stable, adjustable, constant current source 1, an electrically conductive test specimen 3, current sensing means 22 and voltage sensing means 47. The invention comprises a temperature sensitive voltage output means 29, having a portion 2 proximately located with respect to test specimen 3. In this embodiment the signal to the voltage sensing means is adjusted to compensate for temperature changes of the test specimen 3 due to environment temperature changes in which the probe is placed.

The stable, adjustable, constant current source 1 has a first output terminal 31 and a second output terminal 5 and is connected in the circuit with the first output terminal 31 connected to the circuit reference. The second output terminal 5 is connected to the current sensing means 22. The fouling test specimen 3 has a first end 23 and a second end 24 and is connected in the circuit with the first end connected to terminal 31 of current source 1. The second end 24 is connected to the current sensing means 22. The current sensing means 22 may be an ammeter, a current sensing recorder, or other current sensing devices, while on the other hand the voltage sensing means 47 may be a voltmeter, a voltage sensing recorder, or other voltage measuring devices. Two devices may well be used to accomplish the voltage and current detecting of the invention; however, a combination device may well be used. A differential input operational amplifier 11 has an output 12 connected to the voltage sensing means 47. Operational amplifier 11 has a first input terminal 14 connected to end 24 of probe 3 and a second input terminal 13 connected to an output terminal 58 of a multiplier 42.

The voltage output means which is the thermocouple 29 has a temperature sensitive portion 2 proximately located with respect to the test specimen 3. Although a thermocouple is used in the preferred embodiment, the voltage output means may be comprised of a thermistor and a voltage source such as a battery or the like. An operational amplifier 15 has input terminals 16 and 17 connected to the output terminals of thermocouple 29 with a bucking voltage source 30 connected in series with thermocouple 29 and input terminal 16. Operational amplifier 15 also has an output 18 connected to a first input terminal 40 of multiplier 42. Bucking voltage source 30 is used to reference thermocouple 29 to the reference temperature. Although thermocouple and bucking voltage sources are used, a single thermocouple may be used along with an operational amplifier with an internal thermocouple reference.

A variable reference voltage source 21 is connected to the second input terminal 50 of multiplier 42. The common input terminal 51 of multiplier 42 is connected in the circuit reference.

The novelty of this invention resides in the incorporation of a voltage output means having a temperature sensitive portion adjacent to the probe which will adjust the signal to voltage sensing means 47 to compensate for temperature variations of the environment in which the probe is placed.

In the operation of this embodiment, there is a voltage $V_T$ appearing across the test specimen 3 and a constant current $I$ flowing through the specimen initiating from current source 1. Since the resistance of the test specimen 3 will normally increase with an increase in temperature or decrease with a decrease in temperature, the voltage signal detected must be increased or decreased accordingly so that there is no change in its value due to temperature variations of the environment at any instantaneous value of $K$.

The various components of the invention are well known devices. The thermocouple 29 is a voltage source which varies with temperature and the bucking voltage source 30 is set to a specific thermocouple reference voltage $V_{Te}$. Operational amplifier 15 multiplies the input voltage $(V_{th}) = \alpha_1 \Delta T$ by a gain factor which is equal to $\alpha_2/\alpha_1$ where $\alpha_2$ is equal to the temperature coefficient of resistivity of probe 3 defined at the reference temperature of the thermocouple and $\alpha_1$ is the temperature coefficient of resistivity of the thermocouple defined at the same temperature. Multiplier 42 multiplies the input signals of terminals 40 and 50 to result in a correction signal utilized to compensate for temperature changes which appears at output terminals 58 and 52. Terminal 52 of multiplier 42 is connected to the circuit reference while terminal 58 is connected to the input terminal 13 of operational amplifier 8.

The differential input operational amplifier 11 modifies the difference in voltage applied to its inputs. That is, the voltage on the inverting (−) input terminals may be considered to be subtracted from the voltage of the non-inverting (+) input terminal, and the resultant differential voltage times a gain factor appears at the operational amplifier output.

Considering a general case where the temperature within the environment changes and consequently the temperature of the probe 3 changes, a voltage $V_{th} = \alpha_1 \Delta T$ will result at the input terminals 16 and 17 of the amplifier 15. The signal is multiplied by a gain factor which is equal to $(\alpha_2/\alpha_1)$ and thus $\alpha_2 \Delta T$ appears at input terminal 40 of multiplier 42. The voltage $\alpha_2/\Delta T$ is multiplied by a reference $V_{ref}$ from voltage source 21 by voltage in multiplier 42 to result in a voltage signal $V_{ref}\alpha_2\Delta T$ at the output terminal 58 of the multiplier 42.

If a decision is made that a particular temperature of the environment is the reference temperature $(T_e)$, the temperature reference voltage source 30 is set to make the voltage level at terminal 40 equal to 0; then the constant current source 1 is adjusted with a constant current $I$ so that a desired voltage $V_e$ exists across the probe. The reference voltage source 21 is then adjusted to have the same voltage $(V_e)$. Consequently, any change from $(T_e)$ would result in a correction signal $V_e\alpha_2(T-T_e)$ at terminal 58 of multiplier 42 and thus at input terminal 13 of amplifier 11.

Any change in environment temperature that would result in a change in voltage at terminals 16 and 17 of amplifier 15 would also give a corresponding change in the voltage level at input terminal 14 of amplifier 11. Thus, the actual total voltage at terminal 14 would be equal to $V_T = V_e + \alpha_2 V_e (T-T_e) + \Delta VK$, where $\Delta VK$ is any change in $V_T$ due to change in the $K$ value. The voltage at output terminal 12 of amplifier 11 is the result of the gain factor $G$ of amplifier 11 which may be made equal to 1 times the difference in voltage at input terminals 13 and 14. The resulting detected voltage signal of the voltage sensing means would be equal to $V = G[(V_e) = \Delta VK]$. It can be seen that if there is a difference in voltage at terminal 14 from the voltage of output signal of amplifier 11 detected by sensing means 22 would represent also a change in voltage $V_K$ due to a change in $K$.

Restated, if the environment temperature changes, the resistance of the probe will change from $R_e$, the resistance at the reference temperature, to $R_e + \alpha_2 R_e (T-T_e)$ or $R_e [1 + \alpha_2 (T-T_e)]$. The corresponding voltage $V_T$ across the probe 3 will be $I R_e [1+\alpha_2(T-T_e)]+\Delta VK$ or $V_e [1+\Delta_2(T-T_e)]+\Delta VK$, since $I R_e$ is equal to $V_e$. This total voltage signal $V_T = V_e + \alpha_2 V_e(T-T_e)+\Delta V_K$ is applied to input terminal 14 of amplifier 11 while the temperature correction signal $\alpha_2 V_e (T-T_e)$ from multiplier 42 is applied to terminal 13 of amplifier 11. The resulting voltage signal detected will be the temperature compensated signal $V = V_e + \Delta V_K$ and any changes in this signal will indicate changes in $K$.

$K$ can be accurately determined by detecting the voltage across the probe. As set forth hereinbefore the general formula for determination of $K$ is:

$$K = (VI^2\alpha_2 R_e)/[(V-I R_e) F]$$

where $V$ is equal to $V_e + \Delta V_K$ and $I$ is the constant current flowing through the probe.

Figure 2:
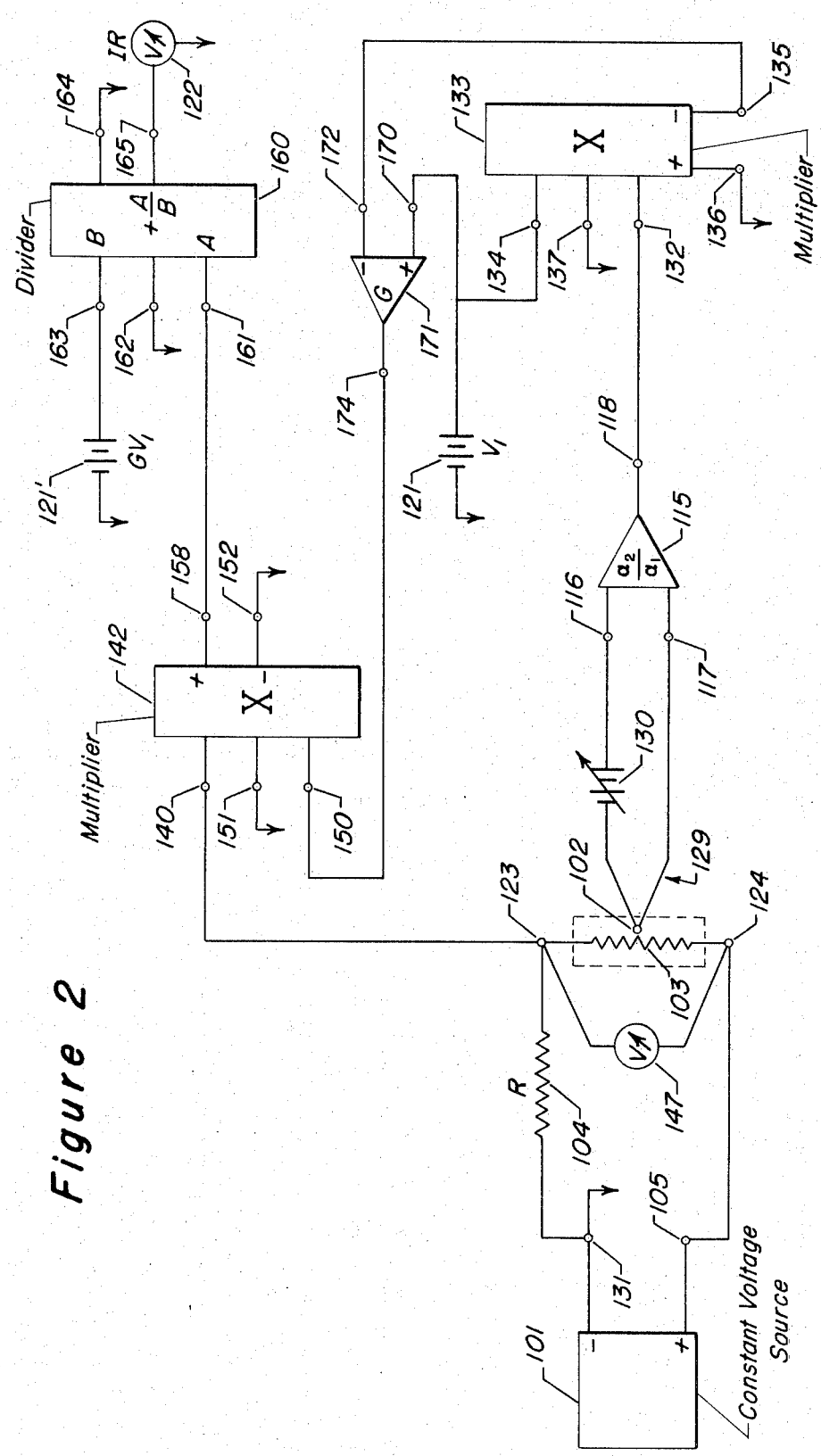
FIG. 2 of the drawing is a diagram of a resistance probe fouling measuring device according to this invention utilizing a constant voltage source.

Reference is now made to FIG. 2 of the drawing where there is shown a resistance probe fouling measuring device having a stable, adjustable, constant voltage source 101, an electrically conductive test specimen 103, current sensing means 122 and voltage sensing means 147. The invention comprises a temperature sensitive voltage output means 129, having a portion 102 proximately located with respect to test specimen 103. In this embodiment the signal to the current sensing means 122 is adjusted to compensate for temperature changes of the test specimen 103 due to environment temperature changes in which the probe is placed.

The stable, adjustable, constant voltage source 101 has a first output terminal 131 and a second output terminal 105. The voltage sensing means 147 and the current sensing means 122 may be voltmeters, voltage sensing recorders, or other voltage measuring devices.

The voltage output means which is the thermocouple 129 has a temperature sensitive portion 102 proximately located with respect to the test specimen 103. Although a thermocouple is used in the preferred embodiment the voltage output means may be comprised of a thermistor and a voltage source such as a battery or the like. An operational amplifier 115 has input terminals 116 and 117 connected to the output terminals of thermocouple 129 with a bucking voltage source 130 connected in series with thermocouple 129 and input terminal 116. Operational amplifier 115 also has an output 118 connected to a first input terminal 132 of a multiplier 133. Bucking voltage source 130 is used to reference thermocouple 129 to the temperature $T_e$. Although a thermocouple and bucking voltage source are used, a single thermocouple may be used along with an operational amplifier with an internal thermocouple reference.

A reference voltage source 121 is connected to a second input terminal 134 of multiplier 133 and to a first input terminal 170 of a differential operational amplifier 171. An output terminal 174 of amplifier 171 is connected to a first input terminal 150 of multiplier 142. The common input terminal 151 of multiplier 142 is connected to the circuit reference and terminal 123 of probe 103 is connected to a third input terminal 140 of multiplier 142. Multiplier 142 has an output terminal 158, which is connected to an A input terminal 161 of a divider 160. Output terminal 152 of multiplier 142 is connected to the circuit reference. A voltage source 121' is connected to a B input terminal 163 of divider 160. Common input terminal 162 is connected to the circuit reference. An A/B output terminal 165 is connected to a voltmeter 122. The other output terminal 164 of divider 160 is connected to the circuit reference.

In the operation of this invention, there is a constant voltage appearing across the test specimen 103 and a current flowing through the specimen which is driven by constant voltage source 101. Since the resistance of the test specimen 103 will normally increase with an increase in temperature or decrease with a decrease in temperature, the current signal detected in sensor 122 must be increased or decreased accordingly so that there is no change in value due to temperature variations of the environment at any instantaneous value of $K$. Actually, as previously stated, current sensor 122 is a voltmeter. The signal detected will be a voltage drop readily converted to a current signal.

The various components of the invention are well known devices. The thermocouple 129 is a voltage source which varies with temperature and the bucking voltage source 130 is set to a specific thermocouple reference voltage $V_{T_e}$. Operational amplifier 115 multiplies the input voltage ($V_{th}$) by a gain factor which is equal to $\alpha_2/\alpha_1$ where $\alpha_2$ is equal to the temperature coefficient of the resistance of probe 103 defined at the reference temperature of the thermocouple and $\alpha_1$ is the temperature coefficient of the thermocouple defined at the same temperature. Multiplier 133 multiplies the signals from operational amplifier 115 and voltage source 121. Multiplier 142 multiplies the input signals of terminals 140 and 150. Divider 160 divides the signals from terminal 161 by the signal from terminal 163 to result in a modified signal which is compensated for temperature changes.

The differential input operational amplifier 171 in the system modifies the difference in voltage applied to its inputs. That is, the voltage on the inverting (−) input terminals may be considered to be subtracted from the voltage of the noninverting (+) input terminal, and the resultant differential voltage times a gain factor $G$ appears at the operational amplifier output.

Considering a general case where the temperature within the environment changes and consequently the temperature of the probe 3 changes, a voltage $V_{th} = \alpha_1 \Delta T$ will result at the input terminals 116 and 117 of amplifier 115. This signal is multiplied by a gain factor which is equal to $(\alpha_2/\alpha_1)$ and its product appears as $\alpha_2 \Delta T$ at input terminal 132 of multiplier 133. The voltage signal $V_1$ from the voltage source 121 appears at input terminals 134 and 170 of multiplier 133 and multiplier 171 respectively. The voltage $\alpha_2 \Delta T$ at terminal 132 is multiplied by the voltage $V_1$ at terminal 134 in multiplier 133. Thus, the voltage at the (−) output terminal 135 of multiplier 133 is equal to $-\alpha_2 \Delta T V_1$. This signal appears at input terminal 172 of differential operational amplifier 171. In amplifier 171, the signal $-\alpha_2 \Delta T V_1$ appearing at input terminal 172 is subtracted from the signal $V_1$ appearing at input terminal 170 and the difference is multiplied by a gain factor $G$, which may be made equal to 1, to result in a signal at output terminal 174 equal to:

$$G(V_1 + \alpha_2 V_1 \Delta T)$$

or $$GV_1(1 + \alpha_2 \Delta T)$$

This signal is transmitted to input terminal 150 of multiplier 142.

The voltage signal at input terminal 140 of multiplier 142 as referenced to the circuit reference is equal to the voltage drop across the resistor 104. That is, if $I_T$ is the total current through the circuit loop from terminal 105 to terminal 131 of the voltage source then the signal to terminal 140 is equal to $I_T R$. In terms of the constant voltage $V$ across the probe the following can be stated:

$$V = I_T R_e [1 + \alpha_2(\Delta T)]$$

where $R_e$ is the reference resistance of the probe 103 at the reference temperature, $I_T$ is the total current through the loop, and $\alpha_2$ as previously stated, is the temperature coefficient of resistivity of the probe at the reference temperature. Furthermore, $R_e = V/I$, where $I$ is equal to $I_e + \Delta I_K$, and where $I_e$ is the current component at reference conditions and $I_K$ is the change in current due to changes in the $K$ value of the probe. Then, $V = I_T V/I [1 + \alpha_2 \Delta T]$ and dividing $V$ from both sides of the equation and solving for $I_T$, $I_T = I/1 + \alpha_2 \Delta T$. It follows that the signal at terminal 140 $I_T R$ is equal to:

$$I_T R = IR/1 + \alpha_2 \Delta T$$

Multiplier 142 multiplies the signals from input terminals 140 and 150 with a result equal to:
$GV_1(1+\alpha_2\Delta T) \times (IR)/(1+\alpha_2\Delta T) = GIV_1R$ at output terminal 158 which is transmitted to the A input terminal 161 of divider 160. The signal from voltage source 121' is transmitted to the B input terminal 163 of divider 160. This signal is made equal to $GV_1$. If $G$ has been set equal to 1, then voltage source 121 and 121' may be a common source. Thus, the signal appearing at the A/B output terminal 165 of divider 160 is equal to:

$$A/B = (GIV_1R)/(GV_1) = IR$$

This is a voltage signal which may be detected directly in voltmeter 122. When detected as a voltage signal it is readily apparent that since $R$ is a constant, the voltage reading is proportional to the current.

As indicated above the detected $I$ is equal to $I_e + I_K$. Thus, any changes in the detected $I$ will only indicate changes in the $K$ value of the probe.

If a decision is made that a particular temperature of the environment is the reference temperature $T_e$, the temperature reference voltage source 130 is set to make the voltage level at terminal 132 equal to 0. Any change from $T_e$ would result in a signal $\alpha_2 V_1 (T-T_e)$ at terminal 135 of multiplier 133 and thus at input terminal 172 of amplifier 171.

Consequently, the signal $GV_1 [(1+\alpha_2(T-T_e)]$ would appear at input terminal 150 of multiplier 142.

Any change in environment temperature that would result in a change in voltage at terminals 116 and 117 of amplifier 115 would also give a corresponding change in voltage level at input terminal 140 of multiplier 142 equal to $I_TR = (IR)/[1+\alpha_2(T-T_e)]$. The voltage at output terminal 158 would be the product of these two terms and would be equal to $GIVR$ and thus any signal detected at voltmeter 122 would indicate $I$.

Restated, if the environment temperature changes, the resistance of the probe will change from $R_e$, the resistance at the reference temperature, to $R_e + \alpha_2 R_e (T-T_e)$ which will change the actual current flowing $I_T$ through resistor 104. The corresponding voltage indicating a change in voltage across the resistor 104 will be $I_TR = (I R)/[1+\alpha_2(T-T_e)]$ which appears at input terminal 140 of multiplier 142. It is recalled that $I$ is equal to $I_e + \Delta I_K$. At the same time the voltage signal at input 150 of multiplier 142 will be equal to $GV_1 [1+\alpha_2(T-T_e)]$. The signal at the output terminal 165 of divider 160 will be equal to $IR$, $R$ being a constant easily removed from the term by scaling the voltmeter properly. If no change in $K$ has taken place, $I$ will be equal to $I_e$, the reference current through the probe. If a change in $K$ has taken place $I$ will be equal to $I_e+\Delta I_K$. Thus a change in $K$ will result in a change in $I$.

Then, as set forth hereinabove $K$ can be accurately determined from the following:

$$K = (VI\alpha_2R_e)/(V-IR_e) F]$$

where $V$ is the constant voltage across the probe, and $I$ is the compensated detected current signal.

It is to be understood that each of the operational amplifiers depicted has its own power source and feedback networks and may be of any conventional design used to achieve the specified functions as previously explained. With modifications, other temperature sensing devices may also be used. The temperature sensing device illustrated is only an example of obtaining the desired current and voltage values. The use of other conventional means for accomplishing the same results is contemplated within the scope of this invention. While particular examples of the correction factors utilized have been shown, modifications may be utilized to obtain the desired result. The invention will be operable as long as the operational amplifiers, multipliers, etc. are chosen so as to adjust the detected signals in response to the temperature sensitive voltage output means to compensate for the resistance change of the test specimen 3 due to temperature changes.

The foregoing description and illustration of the embodiments of this invention are for purposes of illustration only, and no unnecessary limitations should be construed therefrom as other modifications will be obvious to those skilled in the art.

We claim as our invention:

1. Method of measuring the material buildup on the surface of a probe by detecting an electrical signal dependent on the heat transfer coefficient $K$ of a given surface area $F$ of the probe, $K$ being defined as the amount of energy which can be passed through the unit surface per unit time and per unit of temperature measurement, $T_e$, said comprising the steps of:
   a. establishing a voltage value across said probe and a current value through said probe;
   b. detecting a signal representing one of the aforesaid values as the dependent variable;
   c. maintaining the value of the other aforesaid value constant at the reference temperature; and,
   d. adjusting the signal of step (c) to compensate for changes in resistivity of the probe due to incidental temperature deviations of the environment, whereby the detected signal of the dependent variable will indicate a change in $K$ independent of temperature changes of the environment.

2. The method according to claim 1 wherein a signal is detected representing the constant value of step c; wherein $V$ and $I$ comprise the detected signals of voltage and current respectively, wherein, said probe is disposed in an environment having a reference temperature $T_e$, wherein said probe has a resistance $R_e$ at $T_e$ and a temperature coefficient of resistivity $\alpha_2$ at $T_e$; and wherein $K$ is determined according to the relationship:

$$K = (VI^2\alpha_2R_e)/[(V-IR_e)F]$$

3. The method according to claim 1 wherein the voltage value $V$ is made the dependent variable.

4. The method according to claim 1 wherein the current value $I$ is made the dependent variable.

5. Apparatus for measuring the material buildup on the surface of a probe in an environment having incidental temperature deviations by detecting an electrical signal value dependent on the heat transfer coefficient $K$ of a given surface area of the probe wherein said surface area is subjected to a constant current or constant voltage source comprising in combination:
   a. first means for establishing a voltage value across said probe and a current value through said probe;
   b. second means interconnected with said first means for detecting a signal representing one of the aforesaid values as the dependent variable; and,
   c. third means interconnected with said second means for adjusting said second means to compensate for changes in resistivity of the probe due to incidental temperature deviations of the environment, whereby the dependent variable will indicate a change in $K$ independent of temperature changes of the environment.

6. Apparatus according to claim 4 wherein that the voltage value is the dependent variable.

7. Apparatus according to claim 4 wherein that the current value is the dependent variable.

* * * * *